US008650882B2

(12) United States Patent
Woolford et al.

(10) Patent No.: US 8,650,882 B2
(45) Date of Patent: Feb. 18, 2014

(54) WALL ELEMENTS FOR GAS TURBINE ENGINE COMBUSTORS

(75) Inventors: James R Woolford, Bristol (GB);
Stephen J Mills, Ashbourne (GB);
Kevin A White, Derby (GB)

(73) Assignee: Rolls-Royce PLC, London (GB)

( * ) Notice: Subject to any disclaimer, the term of this patent is extended or adjusted under 35 U.S.C. 154(b) by 1550 days.

(21) Appl. No.: 11/652,124

(22) Filed: Jan. 11, 2007

(65) Prior Publication Data
US 2007/0193216 A1 Aug. 23, 2007

(30) Foreign Application Priority Data

Jan. 25, 2006 (GB) .................................. 0601413.8

(51) Int. Cl.
*F02C 1/00* (2006.01)
(52) U.S. Cl.
USPC ............................................................ 60/752
(58) Field of Classification Search
USPC .............................................. 60/752–760, 796
See application file for complete search history.

(56) References Cited

U.S. PATENT DOCUMENTS

| 2,919,549 | A | * | 1/1960 | Haworth et al. | ................ | 60/753 |
| 2,933,895 | A | * | 4/1960 | Cheeseman | ...................... | 60/757 |
| 2,993,337 | A | * | 7/1961 | Cheeseman | ...................... | 60/757 |
| 3,864,199 | A | * | 2/1975 | Meginnis | ...................... | 428/596 |
| 3,899,882 | A | * | 8/1975 | Parker | .............................. | 60/752 |
| 4,064,300 | A | | 12/1977 | Bhangu | | |
| 4,446,693 | A | | 5/1984 | Pidcock | | |
| 4,695,247 | A | * | 9/1987 | Enzaki et al. | ................ | 431/352 |
| 4,887,432 | A | * | 12/1989 | Mumford et al. | ............... | 60/759 |
| 6,408,628 | B1 | * | 6/2002 | Pidcock et al. | .................. | 60/752 |
| 6,494,044 | B1 | * | 12/2002 | Bland | ............................. | 60/772 |
| 6,681,578 | B1 | * | 1/2004 | Bunker | ........................... | 60/772 |
| 2003/0056516 | A1 | | 3/2003 | Hadder | | |
| 2004/0083739 | A1 | | 5/2004 | Pidcock | | |

FOREIGN PATENT DOCUMENTS

| GB | 0762596 | | 11/1956 |
| GB | 1079186 | | 8/1967 |
| GB | 1197197 | | 7/1970 |
| GB | 2125950 | A | 3/1984 |
| GB | 2 356 042 | A | 5/2001 |
| JP | 4-116315 | A | 4/1992 |
| JP | 2003130354 | A | 5/2003 |

OTHER PUBLICATIONS

Japanese Office Action issued in Japanese Patent Application No. 2007-014489 on Feb. 4, 2013.

* cited by examiner

*Primary Examiner* — Phutthiwat Wongwian
(74) *Attorney, Agent, or Firm* — Jeffrey S. Melcher; Manelli Selter PLLC

(57) ABSTRACT

A wall element of a gas turbine engine having an inner hot surface, and an outer cooler surface, during use. A plurality of projections is provided on the outer surface to facilitate heat transfer to a coolant flow during use. The projections are arranged in a first density pattern and in a second higher density pattern for increased cooling. The second higher density pattern is positioned adjacent a hotter region of the tile than the first density pattern to reduce the thermal gradient throughout the wall element.

20 Claims, 7 Drawing Sheets

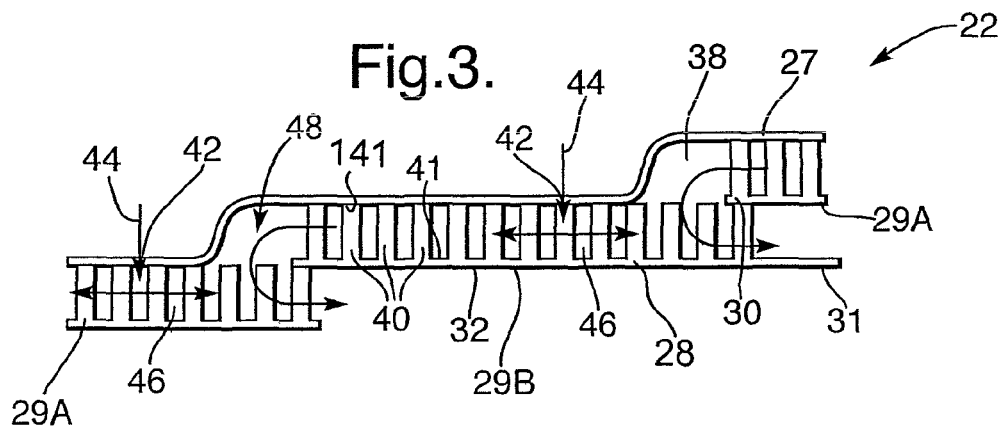
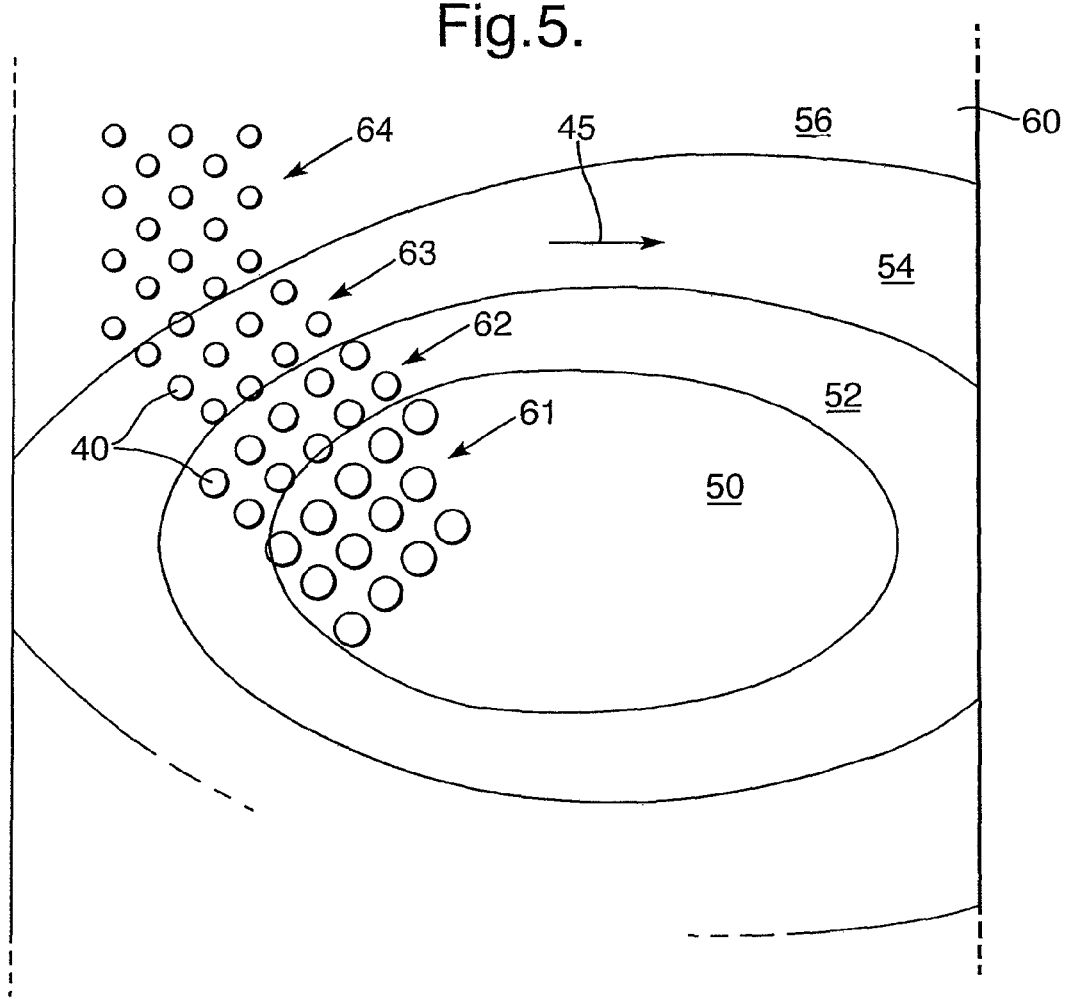

WALL ELEMENTS FOR GAS TURBINE ENGINE COMBUSTORS

CROSS-REFERENCE TO RELATED APPLICATIONS

This application which claims priority to GB 0601413.8, filed 25 Jan. 2006.

BACKGROUND OF THE INVENTION

This invention relates to combustors for gas turbine engines, and in particular to wall elements for use in wall structures of combustors of gas turbine engines.

It is known to construct combustors of gas turbine engines with radially inner and outer double-walls, each having an external wall and an internal wall, the internal wall being formed of a plurality of tiles or other similar wall elements. Air is passed between the internal and external walls to provide cooling. Some of this air passes onto the hot side of the internal walls through effusion cooling holes to form a film of cooling air thereover.

The tiles typically overlap, often with a relatively cooler side of an upstream tile overlapping a hotter side of a downstream tile. This means that cooling air from the cooler side of the upstream tile can pass onto the hotter side of the downstream tile. Some air will also normally pass around the edge of a tile from the cooler side to the hotter side thereof.

Projections such as pedestals are generally provided on the rear of the tiles, extending toward the outer wall, to provide heat transfer. Cooling of the tiles therefore takes place on the cooler side by convection from the projections, and on the hotter side by film cooling. The pedestals are typically arranged in staggered rows to maximise heat transfer. In a prior art tile the array of pedestals are of uniform size and are arranged in a uniform pitch and spacing. For tiles that experience hot spots, such as those immediately downstream of a fuel injector, this arrangement is sufficient to cool the tile, however, there remains a significant thermal gradient across the tile. The thermal gradient gives rise to differential thermal expansions and contractions and consequently internal differential thermal stresses. Such differential thermal stresses, during engine flight cycles, cause thermal fatigue in the tile material and limits the service life of the tile.

The object of the present invention is therefore to maintain a more constant temperature throughout a tile and therefore reduce the thermal gradient and increase the life of the tile.

SUMMARY OF THE INVENTION

According to the invention, there is provided a wall element for a wall structure of a gas turbine engine combustor, the wall element having an inner, in use, hot surface, and an outer, in use, cooler surface; a plurality of projections being provided on the outer surface to facilitate heat transfer to a coolant flow, characterised in that the projections are arranged in a first density pattern and in a second higher density pattern for increased cooling; the denser pattern adjacent a hotter region of the tile than the less dense pattern thereby reducing the thermal gradient throughout the wall element.

Preferably, the density of the projections is graduated between first and second regions.

Preferably, a third pattern or more of projections are provided between the first and second patterns, the third or more pattern having a density of projections between those densities of the first and second patterns.

Preferably, some or all of the projections have a substantially circular cross section.

Preferably, the second higher density pattern comprises rows of projections in a staggered array.

Preferably, the first density pattern comprises rows of projections in a staggered array.

Preferably, the there are at least two regions of pedestals which comprises rows of projections in a staggered array, wherein adjacent rows are offset by different amounts.

Alternatively, at least some of the rows of projections in the first pattern are arranged in line in the general direction of coolant flow, thereby lowering heat transfer.

Alternatively, at least some of the projections in the first pattern are elongate and are arranged in the general direction of coolant flow, thereby lowering heat transfer. Preferably, the elongate projections in the first pattern extend substantially in the downstream direction of the coolant flow.

Alternatively, the cross-section size of the projections in the second pattern is greater than the projections in the first pattern.

Preferably, the number of the projections in the second pattern is greater than the projections in the first pattern within an equivalently sized area.

Preferably, the number of projections in the second pattern is greater than the projections in the first pattern by virtue of the spacing of projections in at least one column of projections.

Alternatively, the number of projections in the second pattern is greater than the projections in the first pattern by virtue of the spacing of projections in at least one row of projections.

Alternatively, the density of projections increases in the downstream direction of coolant flow.

Alternatively, the tile defines a feed hole and the density of projections increases radially away from the feed hole.

Preferably, a combustor wall structure of a gas turbine engine comprises radially inner and outer walls, wherein the inner wall includes at least one wall element according to any of the preceding paragraphs.

BRIEF DESCRIPTION OF THE DRAWINGS

Embodiments of the invention will now be described by way of example only, with reference to the accompanying diagrammatic drawings, in which:

FIG. 3 is a diagrammatic sectional side view of part of a wall structure of a combustor.

FIG. 5 is a view showing an array of pedestal on a wall element in accordance with a first embodiment of the present invention.

DETAILED DESCRIPTION OF THE INVENTION

Figure 1:
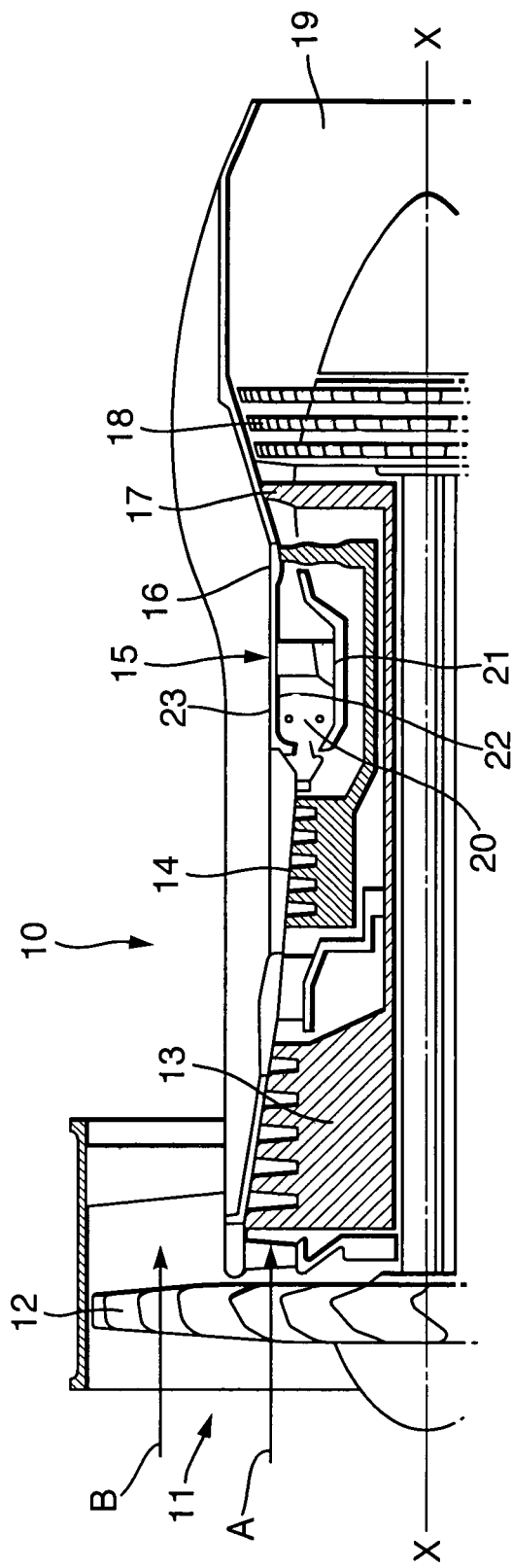
FIG. 1 is a sectional side view of a gas turbine engine.

With reference to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19. The engine 10 has a rotational axis X-X.

The gas turbine engine 10 works in the conventional manner so that air entering the intake 11 is accelerated by the fan to produce two air flows: a first air flow A into the intermediate pressure compressor 13 and a second air flow B which provides propulsive thrust. The intermediate pressure compressor 13 compresses the air flow directed into it before delivering that air to the high pressure compressor 14 where further compression takes place.

The compressed air A exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Figure 2:
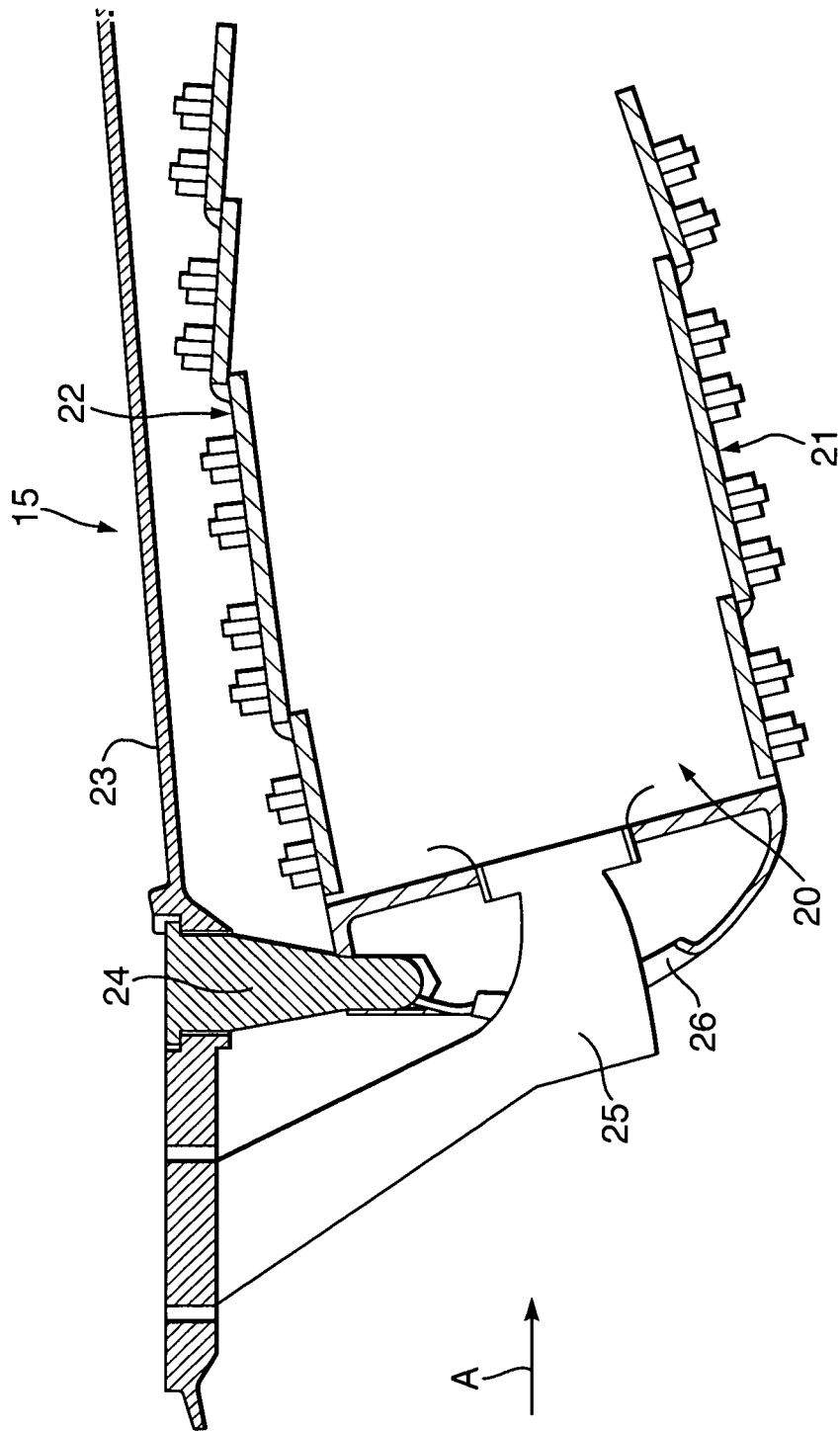
FIG. 2 is a sectional side view of part of a combustor of the engine shown in FIG. 1.

Referring to FIG. 2, the combustor 15 is constituted by an annular combustion chamber 20 having radially inner and outer double-wall structures 21 and 22 respectively. The combustor 15 is secured to a wall 23 by a plurality of pins 24 (only one of which is shown). Fuel is directed into the chamber 20 through a number of fuel nozzles 25 located at the upstream end 26 of the chamber 20. The fuel nozzles 25 are circumferentially spaced around the engine 10 and serve to spray fuel into air derived from the high pressure compressor 14 (air flow A). The resultant fuel/air mixture is then combusted within the chamber 20.

The combustion process, which takes place within the chamber 20, naturally generates a large amount of heat. It is necessary therefore to arrange the inner and outer wall structures 21 and 22 such that they are capable of withstanding the heat.

Referring now to FIG. 3, the radially outer double-wall structures 22 (and radially inner wall 21) comprises an external wall in the form of a liner 27 and an internal wall 28. The terms 'internal' and 'external' are with respect to the combustion chamber 20. The internal wall 28 is made up of a plurality of discrete wall elements in the form of tiles 29A and 29B. Each of the tiles 29A, 29B has circumferentially extending edges 30 and 31, and the tiles are positioned adjacent each other, such that the edges 30 and 31 of adjacent tiles 29A, 29B overlap each other. Alternatively, the edges 30, 31 of adjacent tiles can abut each other.

Each tile 29A, 29B comprises a base portion 32 which is spaced from the liner 27 to define therebetween a space 38 for the flow of cooling fluid in the form of cooling air as will be explained below. Heat removal features in the form of projections or pedestals 40 are provided on the base portion 32 and extend into the space 38 towards the liner 27. Securing means in the form of a plurality of threaded plugs (not shown) extend from the base portions 32 of the tiles 29A, 29B through apertures in the outer wall 27. Nuts (not shown) are screwed onto the plugs to secure the tiles 29A, 29B to the external wall 27.

FIG. 3 shows part of one of the wall structures 21, 22 in more detail and illustrates the airflow. Feed holes 42 are provided in the liner 27 to permit air from the high pressure compressor 14 to pass into the space 38 as illustrated by the arrows 44. Air entering the space will pass forwards and backwards (with respect to the main airflow A through the engine) as illustrated by the arrows 46. At the upstream and downstream edges 30, 31 of the tiles 29A, 29B the air will pass over the inner surface 41 of an adjacent tile 29A, 29B. The terms upstream and downstream are with respect to the main airflow A through the engine.

For forward flowing air the path is simply over the inner hot surface 41 of an adjacent downstream tile 29A, 29B which will be offset outwardly as illustrated in the figure. Forwards flowing cooling air, as illustrated by the arrows 48, will turn 1800 to pass in a downstream direction with the air from the adjacent upstream tile 29A, 29B.

Figure 4:
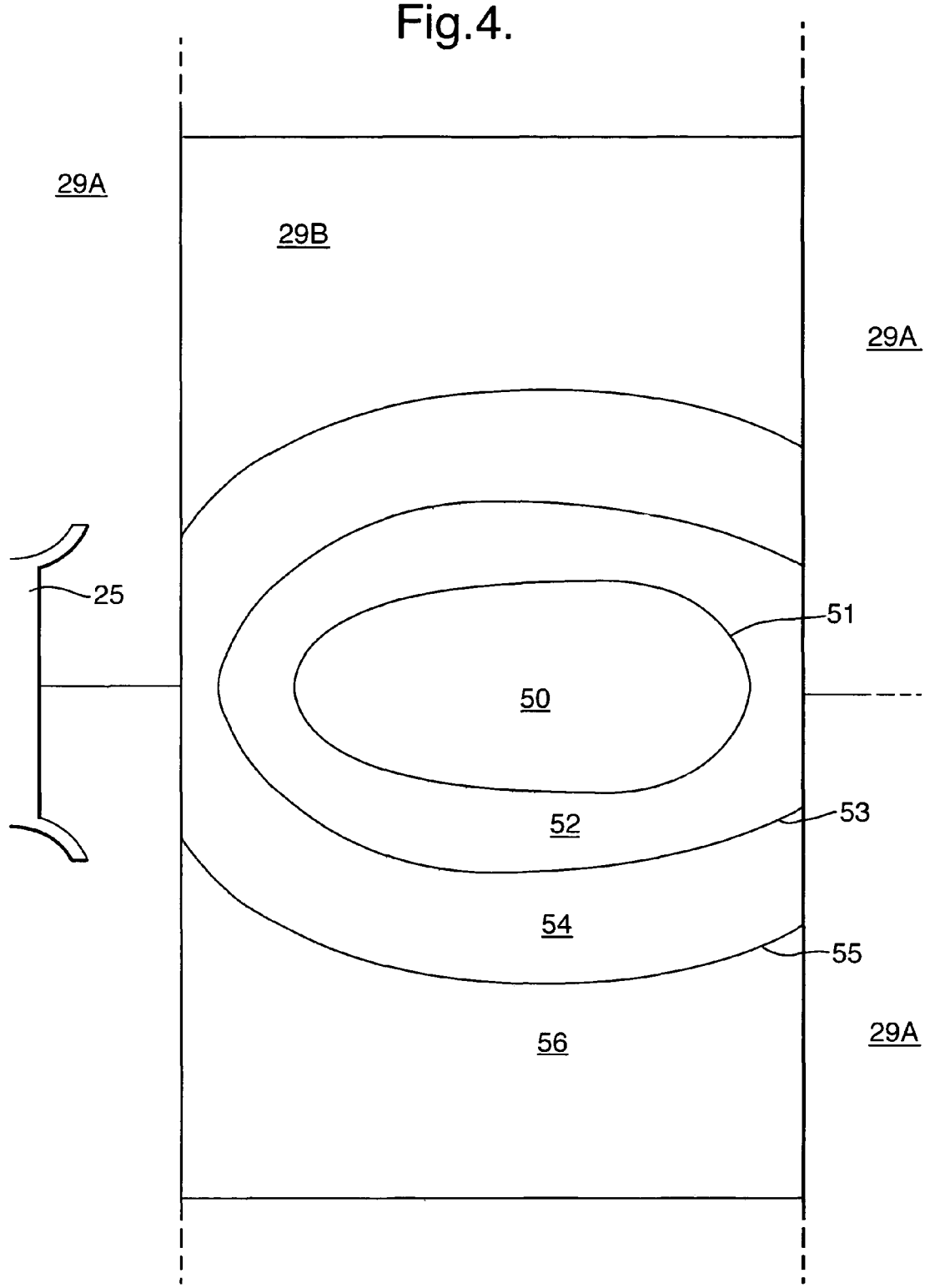
FIG. 4 is a diagrammatic plan view of the outer surface of a first wall element according to the invention.

FIG. 4 shows how temperature may vary over the surface 41 of tile 29B downstream of injector 25. In this example, thermal contours 51, 53, 55 are in increments of 20° C. and define temperature zones 50, 52, 54 and 56. In a prior art tile 29B the array of pedestals are of uniform size and are arranged in a uniform pitch and spacing. Whilst the tile 29B is sufficiently cooled below its melting point, there remains a significant thermal gradient across the tile. During each flight cycle, the engine power demand changes and the amount of heat generated therefore also changes significantly, particularly at engine start up and run down. This leads to substantial thermal gradients across the tile and therefore differential thermal expansions and contractions and consequently internal differential thermal stresses. Such differential thermal stresses cause thermal fatigue in the tile material and limits the service life of the tile.

Thus the object of the present invention is to maintain a more constant temperature throughout and particularly across the surface of a tile and therefore reduce the thermal gradient and thereby increase the life of the tile. The present invention relates to arrangements of pedestals that differentially remove more heat from specific areas of each tile in a preferential and advantageous manner to provide a tile with a more constant thermal profile. An additional benefit of the present invention includes reducing the total amount of cooling air required thereby increasing the efficiency of the engine.

FIG. 5 shows a tile or wall element 60 in accordance with the present invention and subject to a similar temperature regime as described with reference to FIG. 4. An array of projections or pedestals 40 is arranged in a staggered array, such that pedestals in adjacent rows are offset from one another. A row is defined as a line of pedestals substantially normal to the general direction of the coolant flow, shown by arrow 45. The array of pedestals 40 is arranged in a uniform pitch and spacing, however, in each of the temperature zones 50, 52, 54 and 56 the cross-sectional size of the pedestals or projections reduces as shown by the selected regions 61, 62, 63, 64. Thus as the total surface area of the pedestals 40 in each successive region between 64 and 61 increases there is greater heat loss from the tile. Effectively the increase in size of the pedestals 40 (from 64 to 61) means there is an increasing density of pedestal as the tile 60 experiences hotter regions (from 56 to 50). Hence by selecting certain regions of the tile that are known to be subject to greater heat, the sizes of pedestals can be selected such that the tile 60 temperature may be kept more constant.

An additional benefit is also realised as the regions with smaller diameter pedestals incur a lower pressure drop, thereby utilising cooling air more efficiently.

Figure 6:
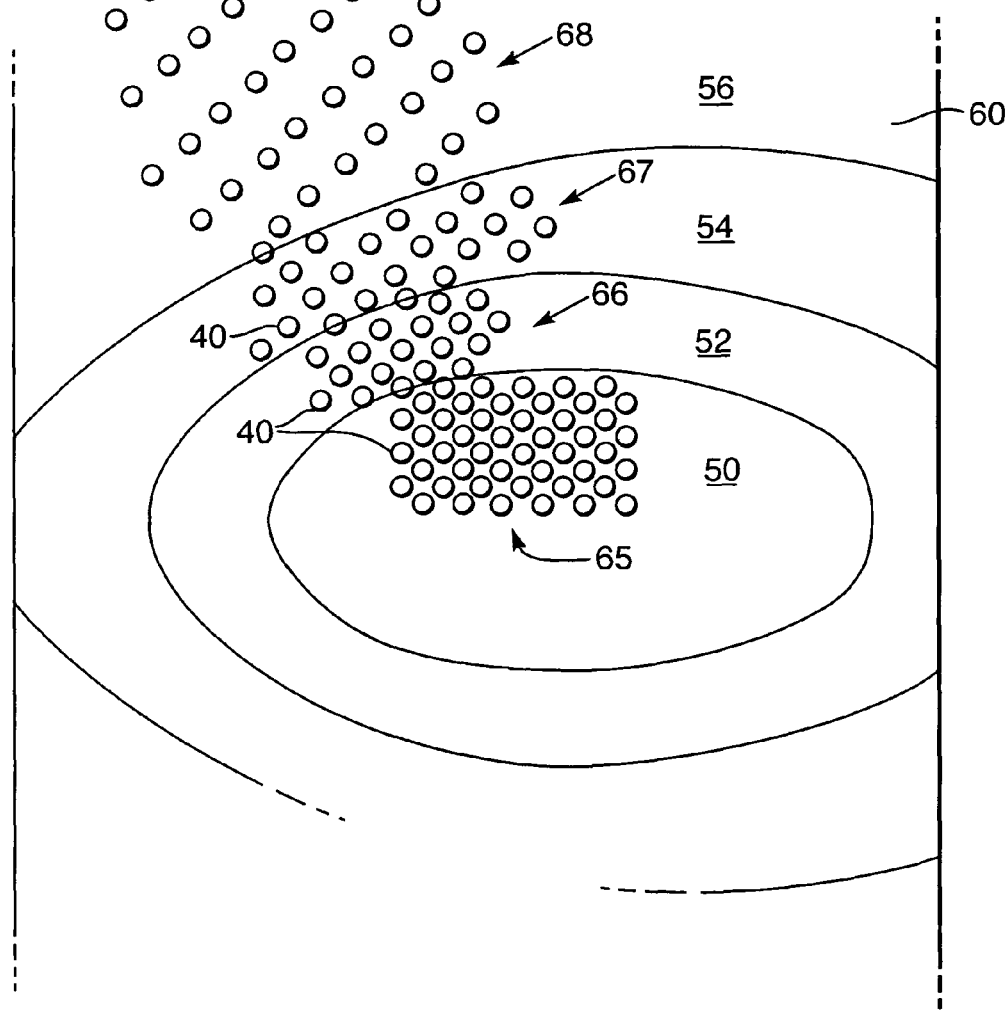
FIG. 6 is a view showing an array of pedestal on a wall element in accordance with a second embodiment of the present invention.

FIG. 6 shows a tile 60 in accordance with the present invention and subject to a similar temperature regime as described with reference to FIG. 4. In each of the temperature zones 50, 52, 54 and 56 the spacing between each adjacent pedestal or projection increases as shown by the selected regions 65, 66, 67, 68. Thus the total surface area of the pedestals, for heat transfer, in each successive region 65, 66, 67, 68 decreases and there is less heat loss/removal from the tile. Hence by selecting certain regions of the tile that are subject to more or less heat and the densities of pedestals the tile 60 temperature may be kept more constant. It should be appreciated that the density of the pedestals may be affected by reducing or increasing the spacing between adjacent rows or columns and in the case of FIG. 6 both rows and columns.

An additional benefit is also realised as the regions with less dense areas of pedestals incur a lower pressure drop thereby utilising cooling air more efficiently.

FIGS. 5 and 6 are described with reference to alleviating thermal gradients around a hot spot caused by the burning combustion gases from the upstream injector 25. Another example of where a significant thermal gradient exists is adjacent a cooling air feed hole 42 (see FIG. 3), there being a large amount of cooling air passing therethrough. The air entering the space 38 between internal and external walls 32, 31 is relatively cool on entry but heats up as it flows away from the feed hole 42. Thus in another embodiment the pedestal density regions are arranged in sequence 64, 63, 62, 61 and 68, 67, 66, 65 radiating away from the feed hole 42. In other words, as the cooling air gets hotter moving away from the feed hole, there is less temperature difference between the cooing air and pedestal; thus to keep a constant heat transfer rate across the tile a greater surface area of pedestal is provided by increasing pedestal density.

The exemplary embodiments of FIGS. 5 and 6 may be further improved upon by graduating the size and/or the spacing of the pedestals according to the temperature gradient imposed on the tile or the temperature of the cooling air itself. Thus in this embodiment, there are no distinct boundaries defining specific patterns or arrays of size or spacing of pedestals. However, the present invention is realised where there are at least a first (e.g. 61, 65) and a second (e.g. 62, 66) pattern comprising pedestals with different densities i.e. pedestal spacing, size or stagger dependent on the temperature the tile experiences.

It should be appreciated that the present invention is realised where there are at least two different areas or patterns of pedestal density. The claimed wall element may comprise at least a third pattern or more (62, 63, 66, 67) of projections provided between the first and second patterns, the third pattern and others having a density of projections between those densities of the first and second patterns.

Figure 7:
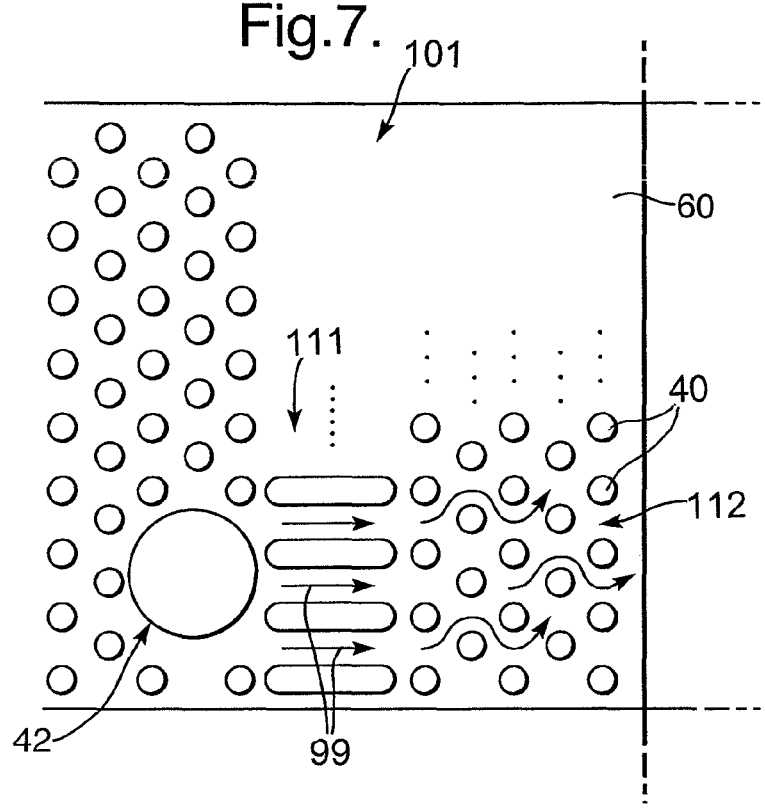
FIG. 7 is a view showing an array of pedestal on a wall element in accordance with a third embodiment of the present invention.

FIG. 7 shows an arrangement of pedestals 101 extending from the base portion 32 of a tile 60 according to the present invention. The tile 60, as in any embodiment of the present invention, may be substituted in place of one or both tiles 29A, 29B in FIGS. 2 and 3. The pedestals 40 are arranged in a first density pattern 111 and a second higher density pattern 112. The first pattern 111 comprises a series elongate pedestals 40, and this pattern is mid section of the tile 60, close to a feed hole 42 (see FIG. 3) for example. The second higher density pattern 112 is spaced from the mid-section by the first pattern 111, and comprises an array of staggered pedestals in conventional style.

Accordingly, for air to pass through the second higher density pattern 112 of pedestals it must follow a tortuous route and is particularly effective in removing heat from the pedestals 40 and thus the first pattern is located where the tile 60 experiences greatest heat. The first pattern 111 is located in a region of the tile where the cooling air is relatively cooler and/or may experience a higher flow rate and therefore where greater heat transfer will occur. The feed hole 42 supplies large quantities of relatively cool air for cooling flow between the internal and external walls 28, 27. As the elongate pedestals 40 of the first pattern 111 are aligned and define channels for the air they do not cause as much turbulence and therefore do not cool as effectively as the array of pedestals 40 of the second higher density pattern 112.

It should be appreciated that the term 'density' is used with respect to the effectiveness of the pedestal arrangement and passing cooling air to remove heat from the tile. Thus where an elongate array of pedestals or an array of in line pedestals are provided, there is significantly less turbulence in the coolant air flow and less impingement on the pedestals and therefore less heat removal. It is possible therefore for the first and second regions to comprise a similar number of pedestals but arranged such that the coolant flow is less obstructed and experiences a lower pressure drop across that region.

Figure 8:
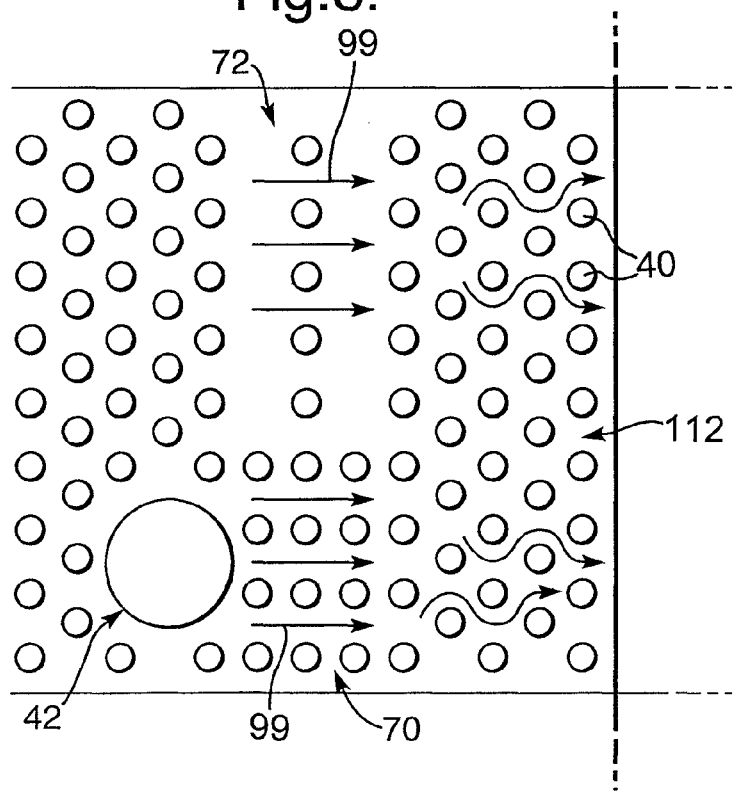
FIG. 8 is a view showing an array of pedestal on a wall element in accordance with a fourth embodiment of the present invention.

In FIG. 8 the tile 60 comprises a first pattern 70 having an array of in line pedestals 40 and operates in similar fashion to the embodiment of FIG. 7. Thus, in FIGS. 7 and 8 embodiments, air passing through the pattern 70 of pedestals 40 moves in a straight line as illustrated by the arrows 99. Effectively the first pattern 70 provides a less dense region of heat removal members and removes less heat from the tile 60 than in the second pattern 112. Furthermore, air flowing through the pattern 70 incurs a lower pressure drop than the second pattern 112, thereby improving engine efficiency.

FIG. 8 also shows another embodiment having a pattern of pedestals 72 where a number of alternate rows (normal, with respect to the direction of cooling air 99) of pedestals from a staggered pattern have been removed, thus creating a less dense region. Thus the airflow may pass in a substantially straight line as indicated by arrows 99.

The skilled artisan should appreciate that the projections or pedestals 40 do not need to be circular in cross section and instead could be elliptical, square or any other convenient cross-sectional shape.

Figure 9:
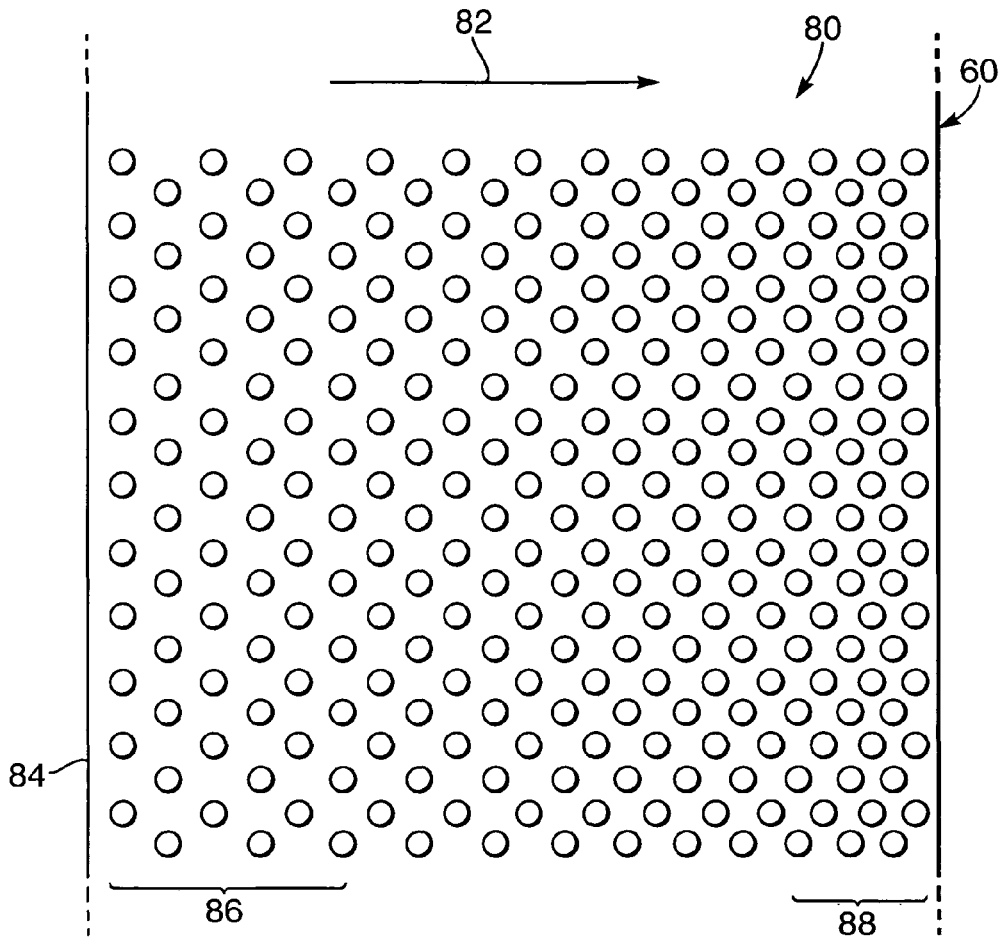
FIG. 9 is a view showing an array of pedestal on a wall element in accordance with a fifth embodiment of the present invention.

FIG. 9 shows a tile 60 comprising an array of pedestals 80 of gradually increasing density in the direction of arrow 82. Where cooling air enters from an upstream edge 84 of the tile 60 rather than a feed hole (e.g. 42 in FIG. 3), the cooling air will increasingly heat up in the direction of arrow 82. Thus as the density and therefore surface area of the array of pedestals increases in the direction of arrow 82, and advantageously the amount of heat removed from the tile remains constant. Although gradually increasing in density, the array of pedestals may still be said to comprise at least two regions having different densities such as designated at 86 and 88. This embodiment is particularly suitable where a constant but high temperature is present over the tile. In a conventional tile the equally spaced and pitched pedestals, together with the increasingly warmer air differentially cools the tile thereby causing a disadvantageous temperature gradient, in the direction of arrow 82, within the tile 60.

In a further embodiment shown in FIG. 9, the number of pedestals per column increases in the direction of arrow 82.

Figure 10:
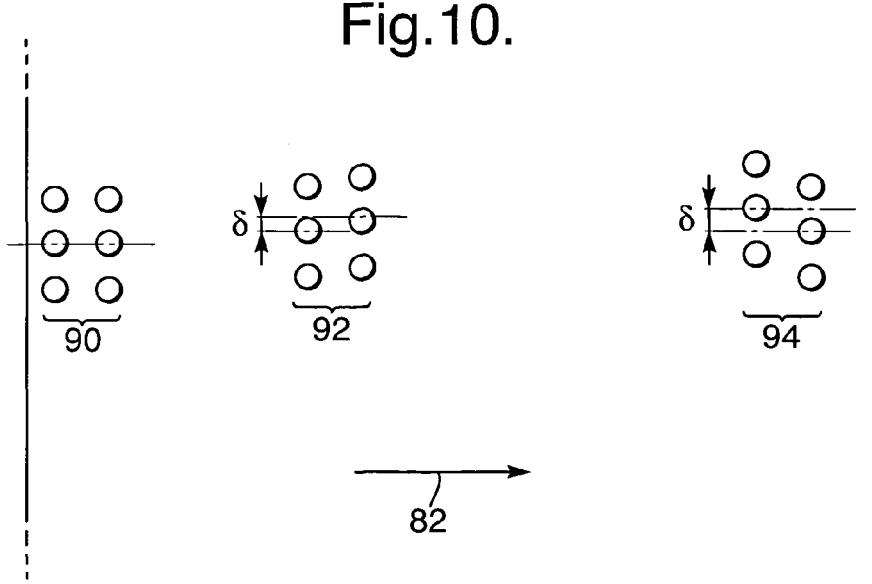
FIG. 10 is a view showing an array of pedestal on a wall element in accordance with a sixth embodiment of the present invention.

Referring to FIG. 10, and as an exemplary embodiment for the tile described with reference to FIG. 9, adjacent rows of pedestals (e.g. regions 90, 92 and 94) are offset a variable amount (distance delta) from one another, such that there is an increasing offset in the direction of coolant flow 82. Thus with this increasing offset the cooling air impinges more effectively of the downstream pedestal and removes more heat or a similar amount of heat where the cooling air is heating up across the tile. It should be appreciated that the pedestal region 94 is 'denser' than region 92, which in turn is 'denser' than region 90. Thus it can be said that region 92 is the second denser region of pedestals and the region 90 is the first region, in accordance with the present invention.

In summary, the present invention is a wall element 29A, 29B, 60 for a wall structure of a gas turbine engine combustor 15, the wall element having an inner, in use, hot surface 41, and an outer, in use, cooler surface 141; a plurality of projections 40 being provided on the outer surface to facilitate heat transfer to a coolant flow, characterised in that the projections 40 are arranged in a first density pattern 111, 70, 72, 64, 68 and in a second higher density pattern 112, 61, 65 for increased cooling; the denser pattern adjacent a hotter region of the tile 60 than the less dense pattern thereby reducing the thermal gradient throughout the wall element 29A, 29B, 60. It should be appreciated that combination of the embodiments described herein may be made and are intended to be within the scope of the present invention. For example, not only may the number of pedestals be increased to increase a region's 'heat removal density', but also the size, spacing offset alignment of rows and shape of the pedestals may be adjusted preferentially.

We claim:

1. A wall element of a gas turbine engine combustor, the wall element comprising:
   an inner hot surface during use;
   an outer cooler surface during use, with respect to the gas turbine engine combustor; and
   a plurality of projections extending from the outer cooler surface to an inner surface of a liner to facilitate heat transfer to a coolant flow during use, wherein said projections are arranged in a first density pattern having a plurality of rows of said projections and in a second higher density pattern aft of the first density pattern having a plurality of rows of said projections with a closer spacing between projections than a spacing between projections in the first density pattern, the second higher density patter providing increased cooling compared to the first density pattern during use, and wherein said second higher density pattern is within a hotter region of the wall element to reduce the thermal gradient throughout the wall element.

2. A wall element according to claim 1, wherein a density of the projections is graduated between first and second regions.

3. A wall element according to claim 1, wherein a third pattern or more of projections are provided between the first and second patterns, the third or more pattern having a density of projections between those densities of the first and second patterns.

4. A wall element according to claim 1, wherein some or all of the projections have a substantially circular cross section.

5. A wall element according to claim 1, wherein the second higher density pattern comprises rows of projections in a staggered array.

6. A wall element according to claim 1, wherein the first density pattern comprises the rows of projections in a staggered array.

7. A wall element according to claim 5, wherein the there are at least two regions of pedestals which comprises the rows of projections in a staggered array, wherein adjacent the rows are offset by different amounts.

8. A wall element according to claim 1, wherein at least some of the rows of projections in the first pattern are arranged in line in the general direction of coolant flow, thereby lowering heat transfer.

9. A wall element according to claim 1, wherein at least some of the projections in the first pattern are elongate and are arranged in the general direction of coolant flow, thereby lowering heat transfer.

10. A wall element according to claim 9, wherein the elongate projections in the first pattern extend substantially in the downstream direction of the coolant flow.

11. A wall element according to claim 1, wherein the cross-section size of the projections in the second pattern is greater than the projections in the first pattern.

12. A wall element according to claim 1, wherein there are more projections in the second pattern than in the first pattern within an equivalently sized area.

13. A wall element according to claim 11, there are more projections in the second pattern than in the first pattern by virtue of the spacing of projections in at least one column of projections.

14. A wall element according to claim 11, wherein there are more projections in the second pattern than in the first pattern by virtue of the spacing of projections in at least one row of projections.

15. A wall element according to claim 1, wherein a density of projections increases in the downstream direction of coolant flow.

16. A wall element according to claim 1, wherein the wall element defines a feed hole and a density of projections increases radially away from the feed hole.

17. A combustor wall structure of a gas turbine engine, the wall structure comprising radially inner and outer walls, wherein the inner wall includes at least one wall element according to claim 1.

18. A wall element according to claim 12, wherein there are more projections in the second pattern than in the first pattern by virtue of the spacing of projections in at least one row of projections.

19. A wall element according to claim 1, wherein the wall element is a tile.

20. A combustor wall structure according to claim 17, wherein the wall element is a tile, and the inner wall comprises a plurality of the tiles.

* * * * *